(No Model.) 5 Sheets—Sheet 1.
N. W. HARTMAN.
GLASS BLOWING MACHINE.
No. 581,158. Patented Apr. 20, 1897.
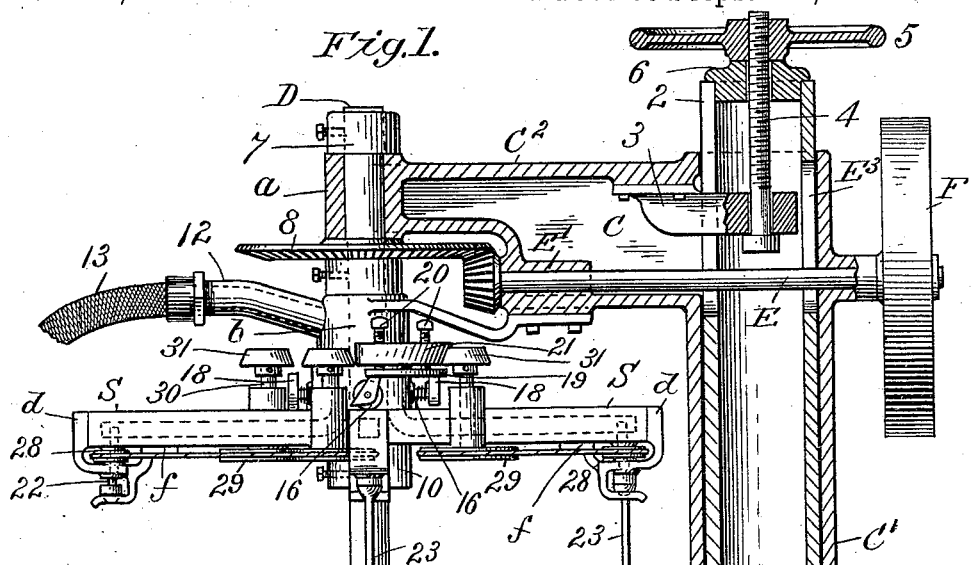
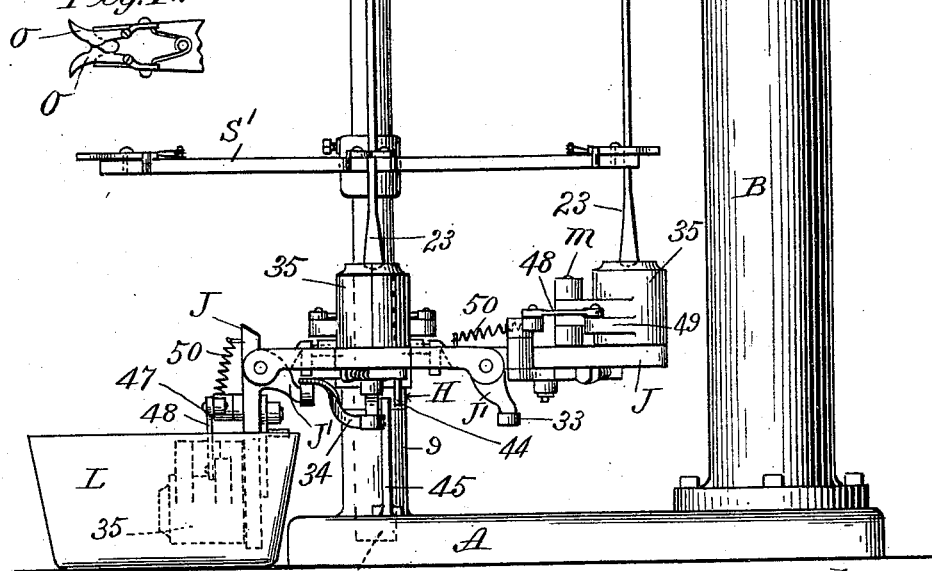
Witnesses:
J. W. Garfield
K. I. Clemons
Inventor,
Noble W. Hartman,
by Chapin & Co.
Attorneys.

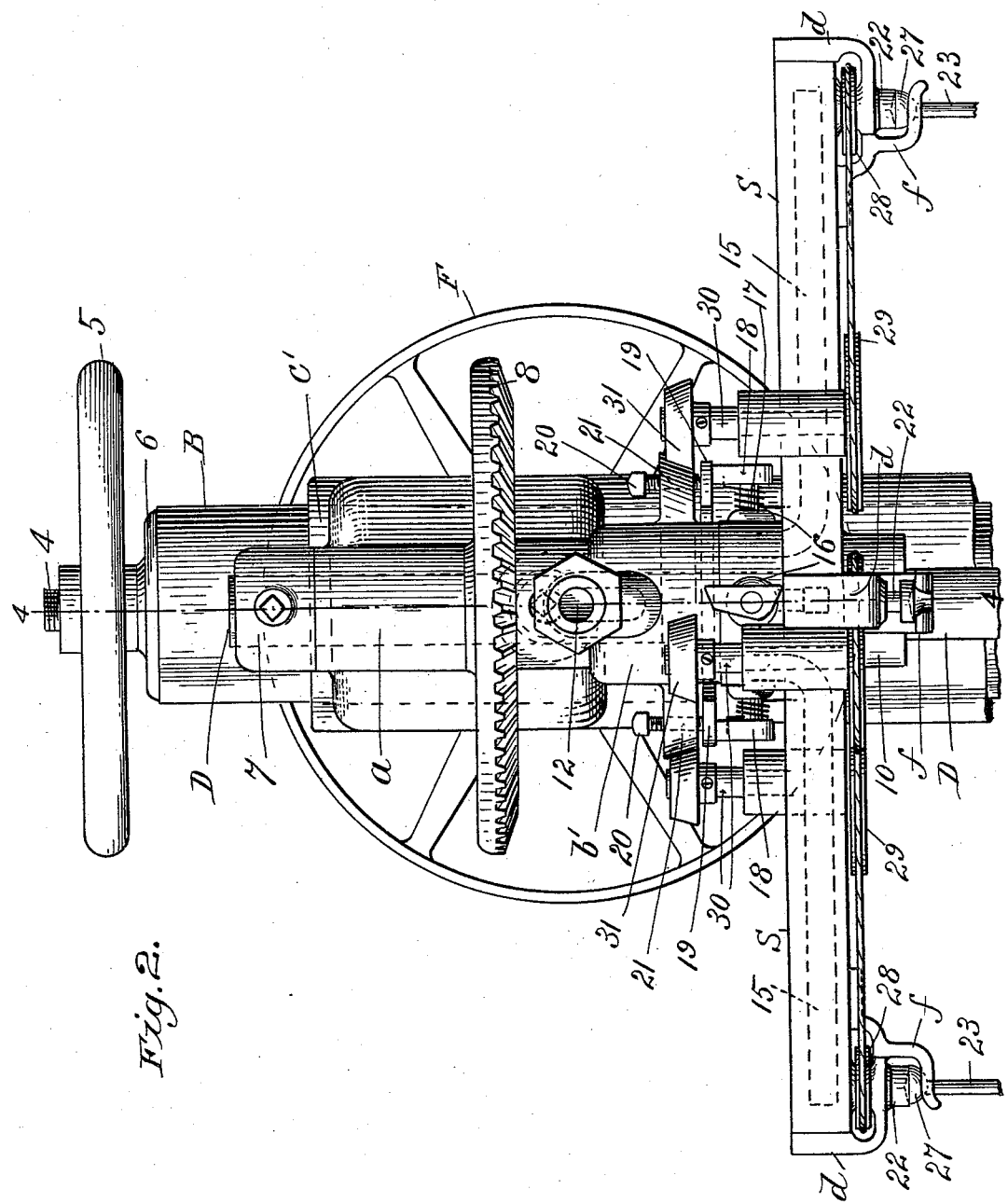

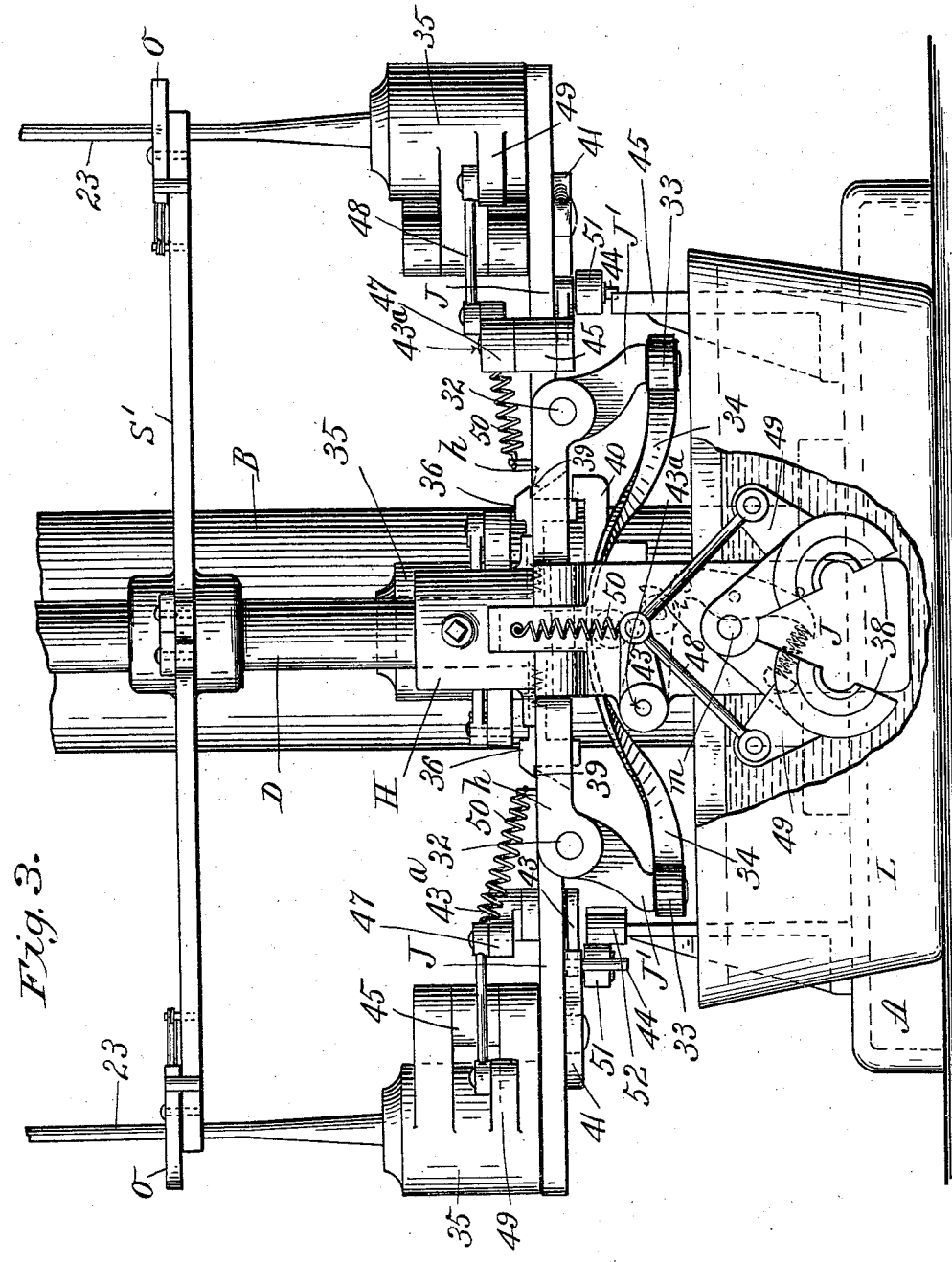

(No Model.)  
5 Sheets—Sheet 4.
N. W. HARTMAN.
GLASS BLOWING MACHINE.
No. 581,158. Patented Apr. 20, 1897.
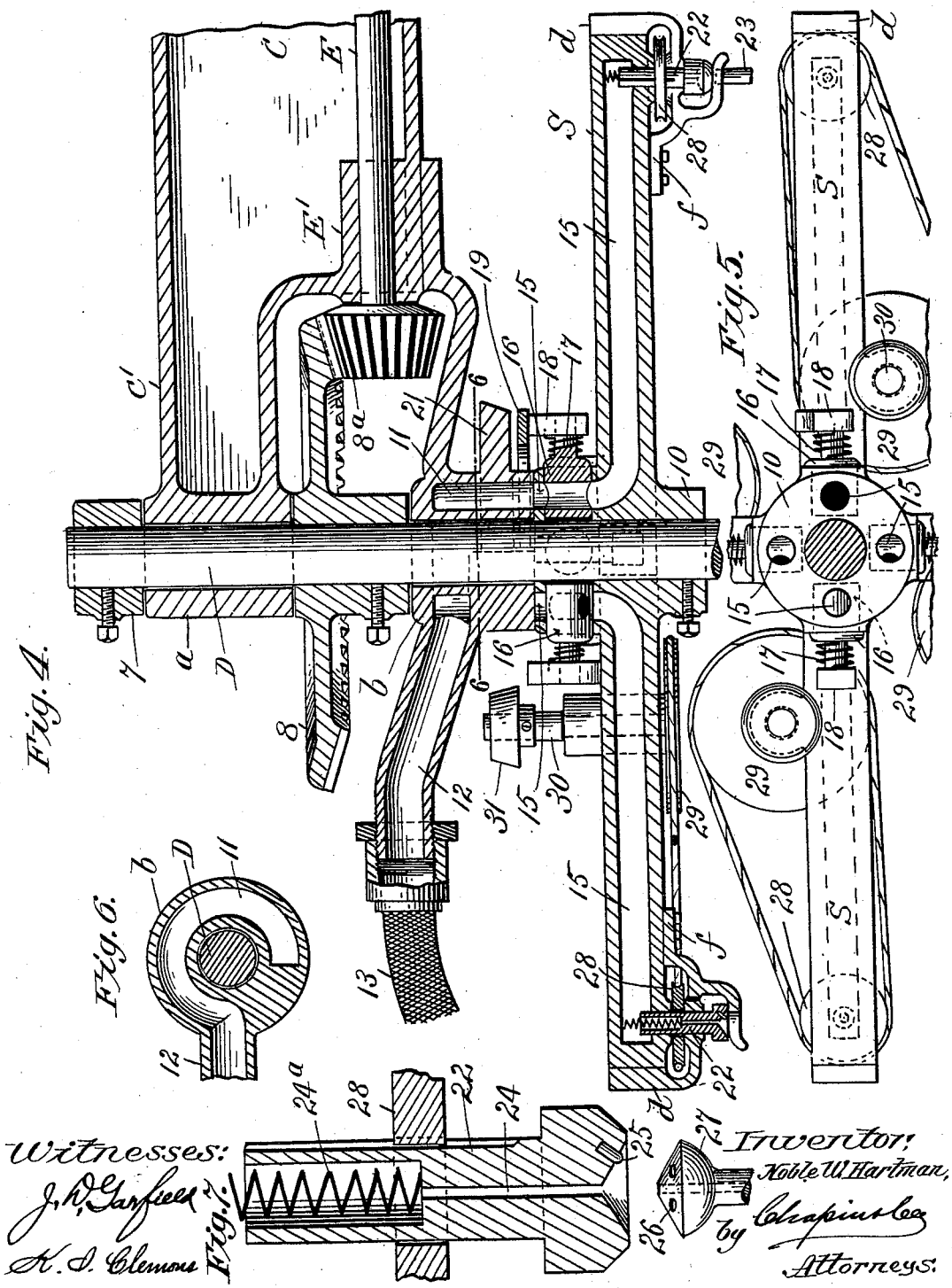

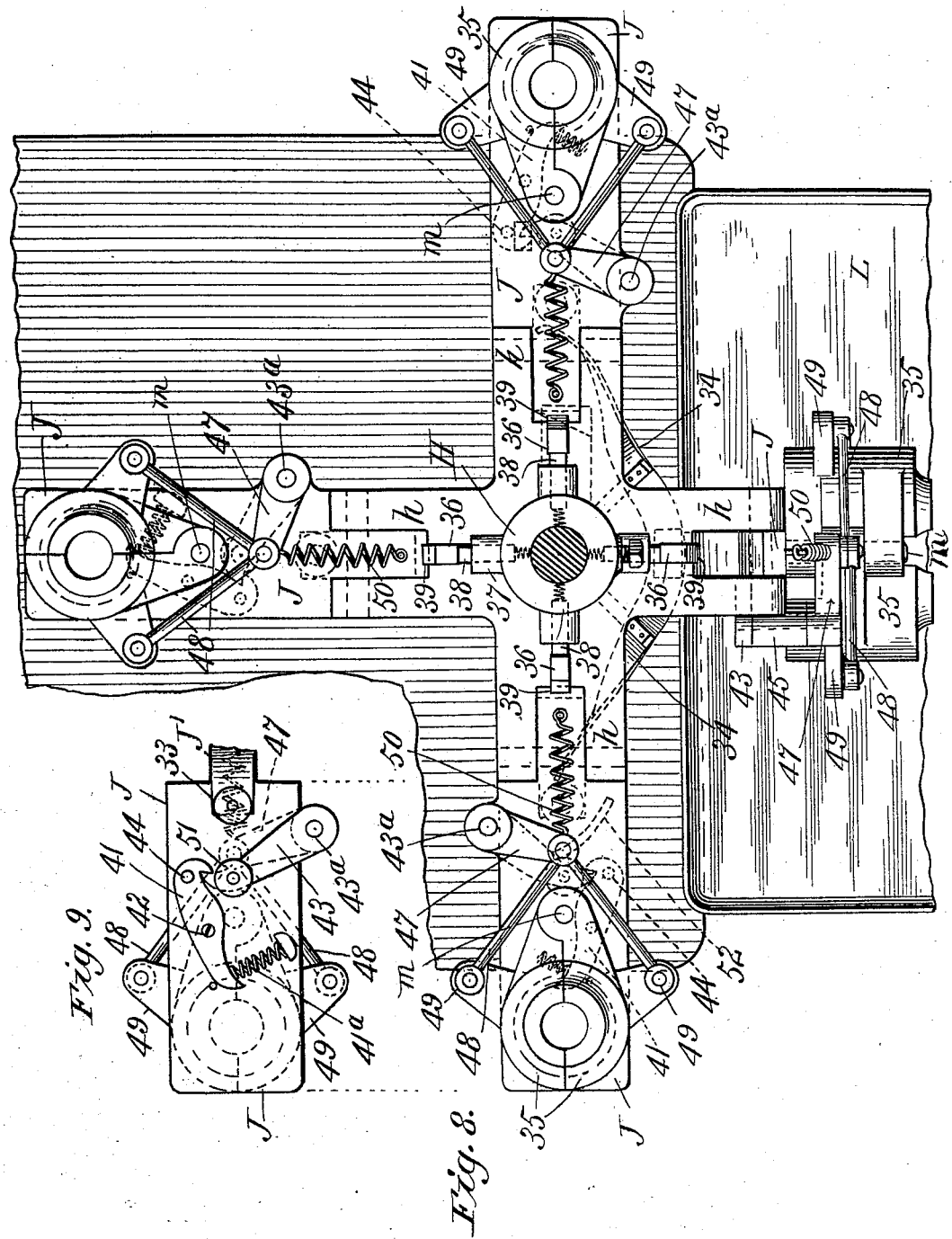

UNITED STATES PATENT OFFICE.

NOBLE W. HARTMAN, OF TOLEDO, OHIO, ASSIGNOR TO THE TOLEDO GLASS COMPANY, OF SAME PLACE.

GLASS-BLOWING MACHINE.

SPECIFICATION forming part of Letters Patent No. 581,158, dated April 20, 1897.

Application filed October 29, 1896. Serial No. 610,477. (No model.)

*To all whom it may concern:*

Be it known that I, NOBLE W. HARTMAN, a citizen of the United States of America, residing at Toledo, in the county of Lucas and State of Ohio, have invented new and useful Improvements in Glass-Blowing Machines, of which the following is a specification.

This invention relates to improvements in glass-blowing machines, and has for its object the construction of a machine of this class having improved means of vertical adjustment for the blow-irons, means for intermittently rotating the blow-irons and for supplying a varying pressure of air thereto, and means for opening, dipping, and closing the molds thereof; and the invention consists in the construction and arrangement of the mechanism, as described in the following specification and more particularly pointed out in the claims.

In the drawings forming part of this specification, Figure 1 is an elevation, partly in section, of a glass-blowing machine embodying my improvements. Fig. 1$^a$ is a plan view of the under side of the end of one of the arms of the upper blow-iron spider. Fig. 1$^b$ is a plan view of the upper side of one of the arms of the lower blow-iron spider. Fig. 2 is an enlarged front elevation of the upper part of the machine. Fig. 3 is a front elevation of the lower part of the machine on the same scale as Fig. 2. Fig. 4 is a sectional elevation on line 4 4, Fig. 2, but not including the standard and the driving-pulley thereon. Fig. 5 is a plan view of two opposite arms of the upper blow-iron spider, showing the air-passages in the hub thereof and means for rotating the blow-iron. Fig. 6 is a sectional view on line 6 6, Fig. 4. Fig. 7 is an enlarged vertical section of one of the chucks in the extremity of the arms of the upper blow-iron spider and showing the upper end of a blow-iron. Fig. 8 is a plan view of the mold-carriers, hinged to the four-armed hub, secured to the main shaft of the machine and water-tank, on the same scale as Figs. 2, 3, and 4 and with the parts in the same positions as illustrated in elevation in Fig. 1. Fig. 9 is a plan view of the under side of one of the mold-carriers.

Referring to the drawings, A is the base of the machine, cast in a suitable form and having bolted thereto near one edge the hollow vertical iron column B.

The head C of the machine consists of a long sleeve C', fitting the upper part of the column B, and the hollow arm C$^2$, cast integral with said sleeve and located at right angles thereto. A vertical slot 2 is cut in the side of the column from the upper extremity thereof, extending downwardly a short distance from said upper end. An arm 3 is bolted to the inside of the hollow arm C$^2$ and projects rearwardly into the hollow column B, the end of said arm within the column being perforated to receive the screw-threaded bolt 4, and that portion of the arm 3 which passes through the slot 2 in the column B fits closely in said slot, whereby the head C is prevented from turning on the column, but yet is free to move vertically thereon. Said vertical movement is imparted thereto by the turning of the hand-wheel 5 on the screw-threaded bolt 4, which bolt has a suitable head thereon engaging with the under side of the arm 3, perforated to receive said bolt.

A cap 6 is provided for the upper end of the column B, and said cap is perforated to permit the passage therethrough of the bolt 4. Said cap affords an abutment for the hand-wheel to act against when it is turned to raise the head C and the parts of the machine depending therefrom. The end of said arm C$^2$ is bifurcated horizontally, and in each part $a$ and $b$ of said bifurcated end a bearing is provided to receive the vertical main shaft D. The said main shaft of the machine is supported in bearings in the ends $a$ and $b$ of the arm C$^2$ by a collar 7, secured to its upper end, said collar bearing against the top of the part $a$, as shown. Said shaft D has a free rotary movement in its bearings in the end of said arm C$^2$, means for imparting said movement consisting of a bevel-gear 8, secured to said shaft between said parts $a$ and $b$ of the arm C$^2$ by a set-screw in the hub thereof or other suitable manner, and a bevel-gear 8$^a$ in mesh therewith, said bevel-gear being secured to the end of a shaft E, suitably supported in a bearing E' within the head C, as shown in Fig.

1. Said shaft passes centrally through the slot 2 of column B in one side thereof and through a slot E³ in the opposite side of said column. On the end of said shaft projecting through said column a pulley F is secured, which by a suitable belt is rotated and by means of the mechanism just described rotates the main shaft D and the various parts secured thereto. The lower extremity of said shaft D has a bearing in a long sleeve 9, cast on the base A, which is of suitable length to permit of more or less vertical movement of said shaft therein.

Close up against the under side of the lower end of the part $b$ of the arm C² is secured to the shaft D by set-screws or other suitable means the upper blow-iron spider S, and at a suitable distance below said spider S is the lower blow-iron spider S', secured to the shaft D in the same manner as is spider S. Said two spiders have each four arms and a central hub cast thereon, and are so secured to said shaft that the arms of each are in the same vertical plane, and each arm of both spiders is provided with means for holding a blow-iron in a perpendicular position for rotational movement therein, to be described farther on.

In the face of the part $b$ of the arm C² lying next to the hub of the spider S is provided (see Fig. 6) an annular channel 11 therein, passing about three-quarters of the way around said part, one end thereof connecting with a hollow arm or conduit 12, preferably cast integral with said part $b$. The outer end of said arm 12 is screw-threaded to receive a suitable coupling for a piece of hose 13 or other flexible conduit, (see Fig. 4,) which may be connected to any suitable mechanism for supplying air under pressure.

The hub 10 of the spider S and its four arms are provided with air-passages 15 therein, which passages, horizontally disposed in the arms of the said spider S, turn upward through the hub 10, and their openings (see Fig. 5) coincide with the opening of the channel 11 in the face of part $b$ of the arm C². The said spider S, as has been stated, is secured to the shaft D, the upper end of the hub 10 thereof and the lower end of the part $b$ of the arm C² being finished off in such manner as will assure a substantially air-tight joint. In each one of said vertical portions of the air-passages 15 in the hub of spider S a plug-valve 16 is located, whereby the passage of air therethrough may be controlled at will. The stems of said valve 16 project outwardly at right angles to the main shaft D, and are provided with spiral springs 17, arranged to close the valves after they have been turned to permit the passage of air therethrough. Said valves are operated for that purpose by a cam-arm 18, fixed on the end of the valve-stem, the upwardly-projecting ends of which arms lie in such position that by the rotation of the spider S with its shaft D said arms 18 are carried under and engage with a cam-plate 19, concentric with said shaft D. The length of said cam-plate 19 determines the length of time said valves shall remain open. Said arms, as soon as they pass out from under the end of the cam-plate 19, are operated by the said spring 17 to close them until they again engage said cam-plate by the continued rotation of the spider on its shaft. Thus the air-passages in each arm of the spider S are automatically and consecutively opened and closed during a part of its revolution. The said cam-plate is adjustable vertically and supported by means of the screws 20, (see Fig. 1,) passing through the semicircular flange 21, cast on the side of the part $b$ of the arm C², and by adjusting said cam-plate in any desired degree of inclination relative to the plane of rotation of the spider S a gradually increasing or diminishing blast of air may be delivered through the passages 15 in the arms of the said spider. If desired, the surface of said cam-plate which said arms 18 engage with may be given such configuration as will admit to the air-passages 15 a blast of air of any desired degree of pressure and duration.

The ends of the arms of the spider S are closed, and an outlet for the air is provided by a perforation made near the ends of said arms and in the under side thereof for the reception of the chucks 22, (see Fig. 4,) which chucks receive and impart rotary movements to the blow-irons 23. Said chucks 22 (the lower ends of which are enlarged, see Fig. 7) are provided with an air-passage 24, the lower end of which terminates in a funnel-shaped mouth having a pin 25 therein for engaging with one of the several holes 26 in the end of the mouth-piece 27 of a blow-iron, and whereby a positive engagement is made between said chuck and said blow-iron for the rotation of the latter.

The end of the chuck 22 lying within the air-passage 15 is counterbored, as shown in Fig. 7, to receive a spiral spring 24ª, one end of which bearing against the bottom of said counterbore and the other against the upper wall of said air-passage serves to maintain a contact between the end of the blow-iron and the funnel-shaped mouth of the lower end of the chuck. Means for holding said blow-iron in the arms of the spider S' consist of two spring-actuated fingers $o$ $o$, (see Fig. 1ᵇ,) having outwardly-flaring ends to permit the easy insertion of the blow-iron into the forked end of the spider-arms. Said springs are of sufficient strength to always hold the iron in proper position, but not sufficiently strong to prevent the withdrawal of said blow-iron from the grasp of said fingers by the hand of the operator. Means for rotating the said blow-iron consist of a grooved or other suitable pulley 28, fixed to the said chuck 22 and connected by a suitable belt with a pulley 29, supported on shafts 30, rotatably supported on the side of the arms of the spider S, near the hub thereof, which shafts are provided on their upper ends with tapered friction-pulleys 31, adapted to engage the similarly-tapered edge of the flange 21, above referred to, cast on the side of the part $b$ of the arm $C^2$.

A bracket $d$ is secured to the extremity of each of the arms of the spider, having an arm thereon extending back under the arm of the spider and parallel thereto and at such a distance therefrom as permits the location of the pulley 28 between the under side of the arm of the spider and the upper side of the arm of the bracket, and said bracket-arm is provided with a hole for receiving the chuck 22.

A second bracket $f$ is secured to the under side of the arms of the spider, having an arm extending under the end of the mouth of the chuck 22 to hold said chuck in position against the thrust of the spring $24^a$. Said pulley 28 engages with the shank of the chuck 22 by a spline-and-groove connection, whereby the chuck is permitted to move vertically through said pulley when a blow-iron is pressed up against the lower end thereof for operative engagement therewith, and said pulley is secured against any vertical movement by its position between the bracket $d$ and the arm of the spider S.

The before-mentioned flange 21 is so located that the contact therewith of the frictional pulleys 31 is coincident with the opening of the air-passages in the arms of the spider, as above described, and said contact is also of about the same duration as the length of time said valves are open for the passage of air therethrough.

If it is desired at any time to stop the axial rotation of the blow-irons 23 and use the machine without imparting rotation to said blow-irons, the pulleys 31 may be dropped on their shafts 30, whereby they will escape contact with the flange 21 during the rotation of the spider S.

As the larger part of the articles made with this machine require the use of sectional paste-molds means for automatically opening and closing them and for automatically dipping them in water between the times of such opening and closing for cooling them and for keeping the paste lining thereof moist are provided as follows: Suitably secured by set-screws or otherwise to the main shaft D is a hub H, having four arms $h$ thereon. The lower end of said hub bears on the top of the long sleeve or bearing 9. The extremities of the arms $h$ are slotted to receive the ends of the mold-carriers J, which are hinged by a pin 32 between the ends of the slotted arms $h$, whereby they are permitted at proper times to have a reciprocatory motion in a vertical plane downwardly from a horizontal to a perpendicular position, as shown in Figs. 1, 3, and 8. Said mold-carriers J are provided with a downwardly-projecting arm J' near their point of connection with the arms $h$, which arms have on the end thereof a bearing-roll 33 for engagement during a certain portion of the revolution of the main shaft with a cam 34, properly supported on said sleeve 9 and concentric with the shaft D, whereby when said mold-carriers reach a certain point in their revolution, each one of them being released from its means of support in a horizontal position at the moment the bearing-roll 33 engages with one end of the cam 34, said mold-carrier is by the latter guided downward on the easy spiral curve of said cam from the horizontal to the perpendicular position and from the perpendicular to the horizontal position again by the continuous rotation of the main shaft D. At that point in the revolution of the molds 35 where this dip of the mold-carrier takes place is located the water-tank L, of suitable dimensions to receive said mold-carriers and molds. Said tank is not attached to the base of the machine.

By referring to Figs. 1, 3, and 8 of the drawings it will be seen that said mold-carriers J are held in a horizontal position on the arm $h$ during that portion of their revolution when they are not engaged with the cam 34 by a latch 36, having a horizontal movement in a slot cut in the arms $h$ near the hub H, and which hub has a hole bored into a boss 37 thereon to receive a stem 38 on said latch, between the end of which stem and the bottom of the hole in which it is located is a spiral spring, whose compression tends to keep said latch pressing outwardly against the end of that part of the mold-carrier between the slotted arms $h$, a lip 39 on said latch overhanging and engaging the upper edge of the end of the mold-carrier and maintaining it in a horizontal position.

Referring to Fig. 3, it is seen that an arm 40 is secured to the long sleeve or bearing 9, the end of which arm has an upturned wedge-point thereon, so located as to engage the wedge-shaped portion of the latch 36 which projects below the under side of the arm $h$, which engagement takes place just as the bearing-roll 33 runs onto the point of the surface cam, (all shown in said Fig. 3 and in plan view in said Fig. 8,) assuming that said mold-carriers are revolving from right to left. Said latch is held out of engagement with the end of the mold-carrier until said carrier has dropped sufficiently to raise the said end of the carrier above the point of the lip 39 on the said latch. Immediately following the disengagement of the said latch (see Figs. 8 and 9) the trigger 41, located on the under side of the mold-carrier J and pivotally secured thereto by a screw 42, is disengaged from the crank-arm 43 by the pin 44 thereon striking against the post 45, (see Fig. 3,) secured to the base A, leaving the latter free to move. Said trigger 41, when moved out of engagement with said arm 43, compresses the spring $41^a$ between its opposite end and a suitable abutment provided therefor, which spring serves to return said trigger to an engagement with arm 43 when the mold closes. Said crank-arm is secured to a vertical pin $43^a$, supported in a suitable boss 46 on one side of the mold-carrier, and to its upper end is secured the crank-arm 47, similar to said arm 43. To the free end of said arm 47 two rods 48 extend to ears 49 on each half of the molds 35, which molds are pivoted to the mold-carrier at *m*, (see Fig. 8,) and also secured to said free end of arm 47 is one end of a spiral spring 50, whose opposite end is secured to a pin in the end of the mold-carrier lying between the slotted ends of the arms *h*. Said spring is under tension when the mold 35 is closed, and hence as soon as the trigger 41 is disengaged from the crank-arm 43 said spring 50 operates by its contraction to open said mold 35, and at about the same time the pin 44 on said trigger disengages from the post 45 and the latch 36 from the arm 40, and by the continued rotation of the mold-carriers said open mold (following the path of the cam 34) is carried down into the water-tank, where it is cooled and has its paste lining moistened, and then the bearing-roll 33 encountering the opposite curve of the said cam said mold rises out of the water, and when nearly at the end of its upward movement toward the horizontal position it is automatically closed by the roll 51 on the end of the crank-arm 43 encountering the suitably-curved vertical cam 52, secured to the base A of the machine, whereby the crank-arm 43 is moved toward the outer end of the mold-carrier, thus moving the crank-arm 47 in the same direction, and through the operation of the rods 48, connecting said crank-arm and the two parts of the mold 35, the latter is closed. This movement is carried far enough to permit the notch in the trigger 41 to again become engaged with the hook on the end of the arm 43, securely locking the parts until such time as the trigger is again operated to release them.

Simultaneously with the locking of the two halves of the mold together the latch 36 again engages with the end of the mold-carrier as the latter resumes its horizontal position, said latch being operated by the spring acting on the end of stem 38 of said latch. The blow-iron is removed with the finished article as said molds open to descend into the water-tank, and another blow-iron is inserted in proper position in the spiders S and S', the upper end 27 thereof entering the funnel-mouth of the chuck 22 and the lower end having a gathering of plastic glass thereon, being held in such position by engagement with the chuck, as described, and with the retaining-clips in the ends of the arms of the spider S' that when the two halves of the mold 35 come together in closing, by the means above described, said gathering of glass and the end of said blow-iron will be inclosed by said mold in proper operative position.

The operation of this machine is effected as follows: As one of the molds rises out of the water-tank L and before the bearing-roll 51 on the end of the crank-arm 43 encounters the vertical cam 52 to close the mold a blow-iron having a fresh gathering of plastic glass is by the operator placed in position in the spiders S and S'. The upper enlarged extremity 27 of the blow-iron 23 is placed above the forked end of the bracket $f$ and forced back into said fork, the lower beveled edge of the chuck 22 and the beveled top of the part 27 of the said blow-iron permitting said end 27 thereof to force upward the said chuck against the action of the spring $24^a$, which spring, when the end of the blow-iron is centrally under said chuck, forces the latter down onto the beveled end of the blow-iron, and a slight turn of the blow-iron by hand is sufficient to cause the pin 25 in the funnel-shaped mouth of the chuck to enter one of the holes 26, as described. Said blow-iron is then pushed in between the spring-clips (illustrated in Fig. $1^a$) in the end of the lower spider S', and the blow-iron is then securely held in a line central with the mold 35, as the two parts of said mold close when they are locked, which locking takes place substantially at the same time the mold-carrier reaches a horizontal position and the lip 39 of the latch 36 is snapped over the end of the mold-carrier, as described. Soon after these movements have taken place the end of the arm 18 on the stem of the valve 16 passes under the surface cam 19, and the said valve is operated to admit air under pressure from the constant supply maintained in the channel 11, said air passing through said valve, the passage 15 in the arm of spider S, and down through the passage 24 of the chuck 22, and from thence into the upper end of the blow-iron.

Simultaneously, or nearly so, with the opening of the valve 16 to admit air to the blow-iron the beveled friction-pulley engages with the beveled edge of the flange 21, rotary movement being imparted to said pulley by such engagement, which movement is transmitted through the pulley 29 and a suitable belt running on said pulley and the pulley 28, secured, as described, to the chuck 22, which engages with the end of the blow-iron and rotates the latter. The article to be blown rotates in said mold under whatever pressure, either constant or varying, which is required during substantially one-half of one revolution of the molds, or from the time the arm J' of the mold-carrier runs off from one end of the cam 34 until it engages with the other end thereof, just before which engagement the air-valve is closed and the beveled friction-pulley 31 becomes disengaged from the flange 21, and upon the opening of the mold, just before it begins its descent into the water-tank L, the blow-iron is removed with the finished article on the end thereof, such removal being accomplished by the operator grasping it and pulling it out from between the spring-actuated clips on the spider S' and disengaging its upper end from the chuck 22 in the same manner.

A glass-blowing machine constructed according to my invention insures an easy and rapid adjustment of the lower ends of the blow-irons to a set of molds of any height, the driving mechanism and air-supplying devices and air-controlling devices and blow-iron supports moving as one.

The construction, furthermore, is simple, and the arrangement of the various elements thereof permits of easy access to all the working parts, and by the use of the means herein described for rotating the blow-irons all jar or vibration resulting from the use of gears, &c., is done away with, and practically no loss occurs from breakage during the operation of blowing.

For the purpose of adjusting the lower ends of the blow-irons to molds of varying heights the set-screw in the hub H, to which the mold-carriers J are hinged, as described, is loosened, so that the shaft D may be moved vertically through said hub. The new molds are then placed in position and secured on the mold-carrier, and by the hand-wheel 5 on the bolt 4 the shaft D, carrying the spiders S and S', and with them the blow-irons, is adjusted to bring the ends of the blow-irons into proper operative relations with the said molds, and the set-screw in the hub H is again tightened, securing the said mold-carriers on said shaft.

Having thus described my invention, what I claim, and desire to secure by Letters Patent, is—

1. In an automatic glass-blowing machine, a base, a single vertical column on the border of said base, a head supported on and extending at right angles from said column, and movable parts supported by said head, means for vertically adjusting said head, and means on said head and moving therewith for imparting motion to said movable parts, substantially as described.

2. In an automatic glass-blowing machine, a base, a single vertical column on the border of said base, a head supported on, and extending at right angles to said vertical column, and adjustable vertically thereon, an air-conduit on said head communicating with an annular channel 11, therein, a main shaft supported for rotation in said base and in said head, driving mechanism for said shaft supported on said head, a spider S, attached to said shaft having air-passages in the hub and arms thereof communicating with said annular channel 11, revoluble air-valves in the hub of said spider, means for operating said valves for the intermittent discharge of air therethrough into the arms of said spider, under variable pressure, one or more molds supported on said shaft, one or more blow-irons, means for supporting said blow-irons in engagement with said spider, and in operative relation to said molds, and mechanism on said spider for rotating said blow-irons, combined and operating substantially as set forth.

3. In a glass-blowing machine, a blow-iron, means for supporting said blow-iron, a pulley supported in said machine and connected with said blow-iron when the iron is in place, and another pulley supported in the machine, a band between the pulleys and means for revolving the second pulley when the machine is operated, substantially as described.

4. In an automatic glass-blowing machine, a base, a support or column B, secured on said base, a head C, supported adjustably on said column, and extending over said base, an air-conduit on said head communicating with an annular channel or passage 11, therein, a main shaft having bearings in said base and said head, and mechanism on said head to drive the said shaft, the spiders S and S', secured fast on said shaft, and one or more molds secured to said shaft, one or more blow-irons supported on said spiders in operative relation to said spider S, and said molds, one or more revoluble tubular chucks supported on the arms of said spider S, for engagement with said blow-irons, means for rotating said chucks induced by the rotary motion of said spider S, revoluble air-valves 16, in said spider S, controlling the supply of air from said passage or channel 11, to said spider, and means for intermittently operating said air-valves, substantially as set forth.

5. In an automatic glass-blowing machine, the head C, having a fixed semicircular flange 21, thereon, the revoluble shaft D, the spider S, attached to said shaft, one or more shafts 30, hung on said spider, having a pulley thereon for intermittent engagement with said flange, the tubular chucks 22, and means for imparting the intermittent rotary motion of said shafts 30, to said chucks, substantially as set forth.

6. In an automatic glass-blowing machine, the head C, having the air-conveying channel 11, therein, an air-conduit communicating with said channel, a parti-continuous cam-plate 19, attached to said head, means for vertically adjusting said cam-plate to varying planes, combined with the spider S, having air-passages therein for communication with said channel 11, revoluble valves 16, each having an arm thereon for engagement with said cam-plate when they are opened, and a spring thereon acting to close the same when disengaged from said plate, substantially as set forth.

7. In a glass-blowing machine, the spider S, having the air-passages 15, therein, one or more tubular chucks 22, hung to rotate on said spider in communication with said air-passages, having a limited vertical movement, a spring 24ª, acting to move said chuck downward, combined with means for rotating said chucks, one or more blow-irons and means for the temporary engagement of said chucks and blow-irons, whereby they have coinciding rotary movements, substantially as set forth.

8. In an automatic glass-blowing machine, sectional molds, means for supporting and rotating the molds, comprising a main shaft, means for supporting and rotating said shaft, a hub H, having one or more radially-extending arms whose extremities are slotted to form the parallel arms $h$, $h$, a mold-carrier J, pivotally hung between said arms $h$, a depending arm $J'$, on said arm J, a spring-actuated latch 36, engaging the inward extremity of said carrier, whereby the latter is temporarily retained in a horizontal position, combined with a latch-tripping arm 40, and a mold-carrier-elevating cam 34, substantially as set forth.

9. In an automatic glass-blowing machine, sectional molds and means for opening and closing said molds consisting of a rotatable main shaft, mold-carriers secured thereto, on which said mold-sections are pivotally secured, two crank-arms 43 and 47, pivoted to one side of said mold-carrier and extending transversely thereacross and moving together as one arm, one above and the other below the mold-carrier, one of said arms being pivotally connected by arms 48, to each half of said mold, and a spiral spring secured to said crank-arm and to said mold-carrier, for retracting said arm, and the other of said arms engaging a trigger 41, whereby said molds are locked in a closed position, a post 45, for disengaging said trigger, a fixed cam 52, and a roll 51, pivoted to said arm 47, engaging with said cam 52, for closing said mold, and means for dipping said molds, substantially as described.

10. In an automatic glass-blowing machine, a rotary main shaft D, means for supporting and dipping the molds thereof consisting of a hub H, secured to the rotating main shaft D, said hub having a series of arms $h$, thereon, the mold-carriers J, hinged to the arms for movement in a vertical plane, spring-latches supported in said hub H, and engaging normally with a part of said mold-carrier, an arm on a fixed part of the machine for retracting said latch, a downwardly-projecting arm on said mold-carrier for bearing against a suitably-formed cam-surface, whereby said mold is permitted to move slowly from a horizontal to a perpendicular position and from a perpendicular to a horizontal position, combined with means for opening said molds and means for supporting and rotating said main shaft, substantially as set forth.

NOBLE W. HARTMAN.

Witnesses:
M. E. HARTMAN,
A. G. WRIGHT.